United States Patent [19]

Sauber

[11] Patent Number: 4,762,291
[45] Date of Patent: Aug. 9, 1988

[54] SELF-LOADING REEL TRAILER

[76] Inventor: Charles J. Sauber, 10 N. Sauber Rd., Virgil, Ill. 60182

[21] Appl. No.: 60,533

[22] Filed: Jun. 11, 1987

[51] Int. Cl.$^4$ .......................................... B65H 19/20
[52] U.S. Cl. ................................ 242/86.5 R; 414/555; 414/911
[58] Field of Search ................... 242/86.5 R, 79, 58.6; 414/911, 555, 546, 547, 24.6, 743, 732

[56] References Cited

U.S. PATENT DOCUMENTS

| | | | |
|---|---|---|---|
| 1,864,676 | 6/1932 | Smith | 414/911 X |
| 2,867,390 | 1/1959 | Anrig | 242/86.5 R |
| 3,902,617 | 9/1975 | Hall | 242/86.5 R |
| 4,091,946 | 5/1978 | Kraeft | 414/555 X |
| 4,228,967 | 10/1980 | Woodruff | 242/86.5 R |
| 4,568,035 | 2/1986 | Ruch | 242/86.5 R |

Primary Examiner—Stuart S. Levy
Assistant Examiner—Katherine Matecki
Attorney, Agent, or Firm—Leydig, Voit & Mayer

[57] ABSTRACT

A trailer is provided having an arched carrying cradle to accommodate a cable reel and side walls to laterally support the reel. There is also a self-loading means to bring the reel from the ground into a position resting in the cradle. A reel bar is positioned through the center hole of the reel onto which a hydraulically driven set of maneuvering arms engage and propel the reel along a sloping reel loading track, provided as part of the trailer, into the cradle. The reel is advanced to a payout position by the maneuvering arms and a set of support arms which also are engageable with the ends of the reel bar. Each support arm is pivotably mounted to the trailer so that one end is free to rotate through a circular arc, the apex of the arc being above the center of the reel as it sits in the trailer cradle, and the support arms being long enough to lift the reel so that it is free to rotate when resting on the support arms. In operation, the arms move the reel rearwardly until they intersect the arc of the support arms. The support arms may then be pivoted into a position so that they engage the reel bar. Thereafter, the first arms move the reel, which now rests on the support arms, forward. To place the reel back in its cradle for transporting, the process is simply reversed.

7 Claims, 4 Drawing Sheets

SELF-LOADING REEL TRAILER

TECHNICAL FIELD

This invention relates to a method and apparatus for self-loading a reel of cable onto a transporting trailer and supporting the reel to be unwound therefrom.

BACKGROUND OF THE INVENTION

At present, heavy electrical wire or cable is wound on large reels which have a hub and center opening therethrough to accommodate sophisticated lifting and support mechanisms for supporting the reel for rotation so that the wire or cable may be unwound therefrom during the wire or cable stringing or pulling operation. Prior art devices have suggested jack-type mechanisms or ball bearing-type mechanisms which have been difficult to use or very costly to manufacture, and in some instances, induced safety hazards to workers working with and manipulating the reel. The prior art devices used to unreel the cable have also taken up considerable amount of storage space as well as space for transportation to and from the job site.

Additionally, prior art devices for the transportation of cable or wire reels have included a flat bed truck with some means of securing the reel to the bed. This has presented the problem of inadvertent disengagement from the bed and damage to the reel. Moreover, loading the reel onto the truck has taken the form of hoists and cranes for lifting and positioning the reel onto the bed which has been a great source of damage to both the reel and workers as accidents often occur.

SUMMARY OF THE INVENTION

It is a general object of the present invention to present an integrated apparatus and method for transporting cable and wire reels, loading such reels onto such transporters and advancing the reels into a position so that cable may be unwound from the reel.

In view of the foregoing, it is a more specific object of the present invention to more safely and securely transport cable and wire reels by supporting the reel from all sides.

It is also an object of the present invention to more safely load cable reels onto a trailer by maintaining contact between the reel and trailer during loading without the need of human assistance.

It is a further object of the present invention to more easily and safely advance the reel into a position so that the cable or wire may be unwound from the reel.

To accomplish the foregoing objects, a trailer is provided having an arched carrying support or cradle portion to accommodate the lower arched portion of the circular ends of a cable reel in order to support the reel by prohibiting downward as well as forward and rearward movement so as to secure the reel during transporting. The trailer is also provided with side walls to laterally support the reel and a means to secure the reel, via securing a reel bar positioned through the central hub of the reel from above to prohibit upward movement, thereby completely securing the reel in the trailer from all sides.

There is also provided a means for self-loading the reel onto the trailer in a safe and efficient manner. In order to bring the reel from the ground into a position resting in the cradle, a reel bar is positioned through the center hole of the reel onto which a hydraulically driven set of maneuvering arms, one at each end, engage. The arms propel the reel along a sloping reel loading track, provided as part of the trailer, towards the front of the trailer until the reel settles in the cradle.

There is also provided a means for lifting the reel up off the cradle into a freewheeling position so that cable or wire can be unwound from the reel. The reel is advanced to a payout position through interaction between the maneuvering arms and a set of support arms, one arm on either end of the reel, which also are engageable with the ends of the reel bar. One end of each support arm is pivotably mounted to the trailer substantially directly beneath the center of the reel as it rests in the cradle so that the other end is free to rotate through a circular arc. The vertical distance between the trailer and the apex of the arc which the support arms traverse is larger than the distance between the trailer and the center of the reel or reel bar as the reel sits in the trailer cradle so that the reel is free to rotate when resting on the support arms. In order to allow the support arms to engage the reel bar, the arms and cradle are proportioned so that the arc of the support arms intersect the path of the reel bar as the reel is loaded onto the trailer. In operation, the arms move the reel rearwardly rntil they intersect the arc of the support arms. The support arms may then be pivoted into a position to engage the reel bar. Thereafter, the first arms move the reel, which now rests on the support arms, forward. The support arms have a length large enough to lift the reel bar so that the reel is lifted above the carrier cradle. The reel is then free to rotate resting on the support arms. In order to place the reel back in its cradle for transporting, the process is simply reversed.

Other objects and advantages will become apparent with reference to the following description when taken in conjunction with the drawings.

While the invention will be described in connection with the preferred embodiment, it will be understood that the following description is not intended to limit the invention to a particular embodiment. On the contrary, it is the intention to cover all alternatives and equivalents as may be included within the spirit and scope of the invention.

DESCRIPTION OF THE PREFERRED EMBODIMENTS

Figure 1:
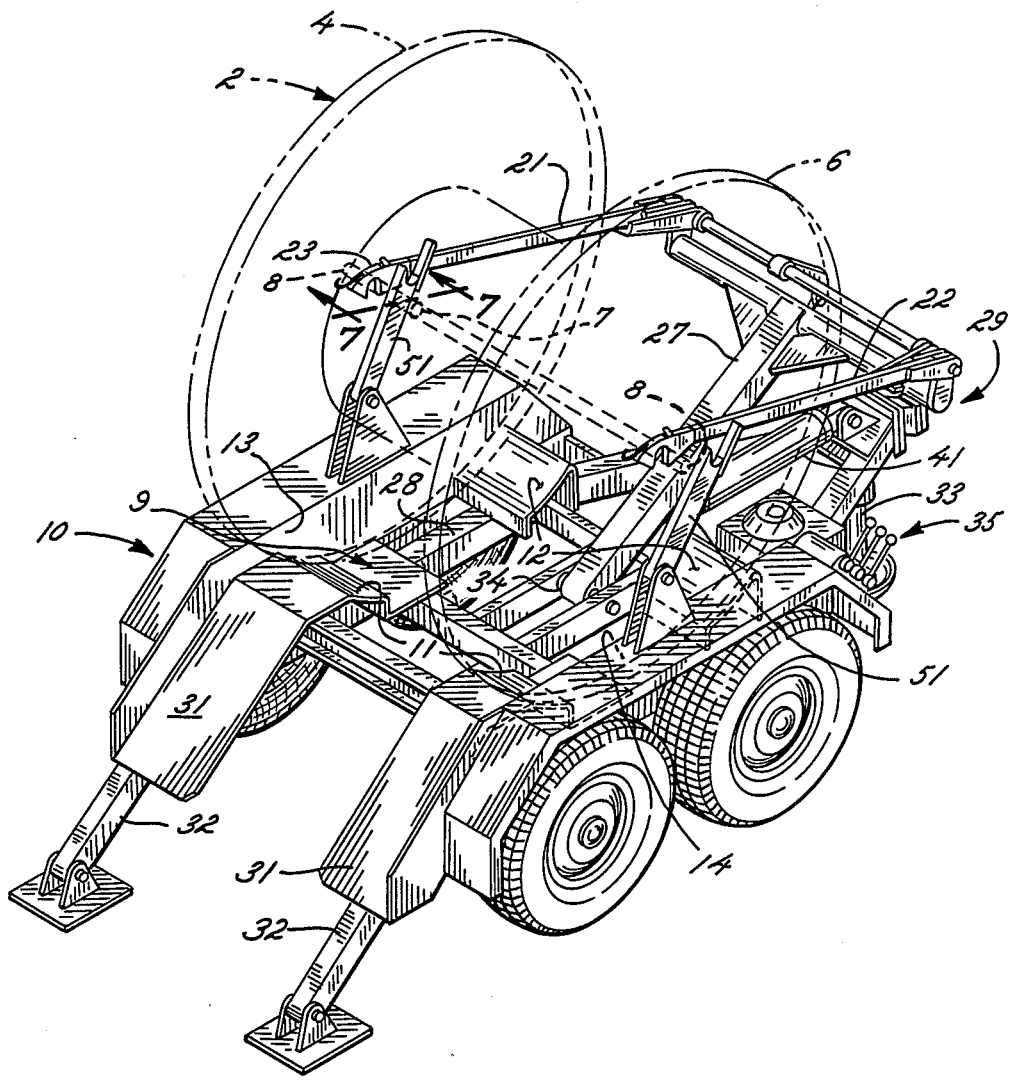
FIG. 1 is a plan view of an apparatus according to the present invention.
Figure 2:
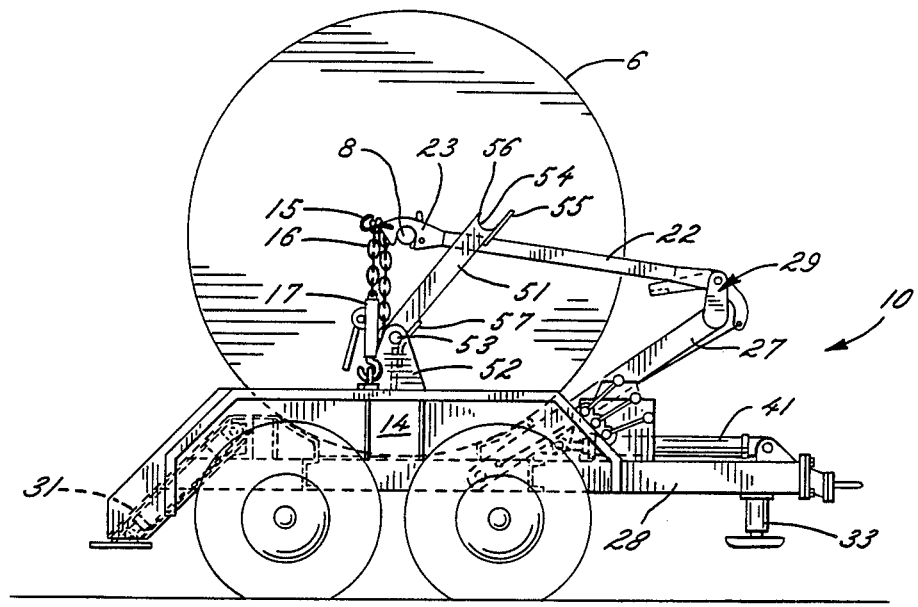
FIG. 2 is a side view of a device in FIG. 1 in a position ready to transport a reel.

Referring generally to FIG. 1, a reel 2 of the type usually utilized for storing lengths of wire or cable has circular ends 4 and 6 with a central drum or hub structure having a central bore 7 terminating through circular ends 4 and 6. Wire or cable is wound in multi-layers upon the drum and it is necessary to elevate and support the reel 2 so that wire or cable may be easily taken off the drum by means of rotating the reel 2. In order to facilitate manipulation and rotation of the reel, reel bar 8 is positioned through central bore 7 of reel 2.

In accordance with one important aspect of the invention, a reel carrier trailer is provided to retard movement of the reel in all directions, i.e. forward, rearward, upward, downward and lateral, during transportation. The trailer has an arched cradle to support and provide stability to the reel from the front, rear, and beneath. Lateral support is provided through a pair of side walls, one on either side of the reel as the reel sits in the cradle. Additionally, there is a means urging the reel bar, and thereby the reel, downward into its cradle to retard upward movement of the reel and complete securing of the reel.

In accordance with another important aspect of the invention, a means for self-loading the reel from the ground to the trailer carrier cradle is provided. Hydraulically activated maneuvering arms engage the reel bar from the front and pull the reel up a ramp provided by the reel carrier trailer until the reel settles in the cradle.

In accordance with another important aspect of the invention, there is provided a means for lifting the reel off of the cradle so that the reel is in a freely rotating position and cable can be unwound therefrom. The reel is advanced to the payout position through the maneuvering arms as well as a second set of rigid support arms positioned on either side of the reel bar which are pivotably mounted at one end to the trailer and, at the other end, free to rotate through a circular arc which passes above the center of the reel bar as the reel is resting in its carrier cradle. The reel, through the maneuvering arms, is moved rearward until engagement with the secondary arms occurs. The hydraulically activated maneuvering arms then move the reel forward, necessarily passing through the arc created by the secondary arms until the secondary arms are vertical, thereby leaving the reel vertically displaced from its transport position in its cradle.

In keeping with the invention, reel trailer 10 is provided with forward and rearward arched supports 11, 12 creating a cradle 9 to accommodate circular ends 4, 6 of reel 2. In order to support reel 2 and retard forward, rearward, and downward movement, arched supports 11, 12 are properly dimensioned to contact reel 2 along a sufficient length of the circular ends 4, 6 and spaced far enough apart to resist forward and rearward movement of reel 2 during transportation and spaced close enough to provide support from underneath. In order to help secure reel 2 in trailer 10 during transportation, reel 2 is laterally supported by trailer sides 13, 14 which are spaced properly to accommodate and snugly hold reel 2 so as to resist lateral movement of the reel.

In order to completely secure reel 2 in trailer 10, a force urging the reel downward toward arched supports 11, 12 is provided. Maneuvering arms 21, 22, which will be described in detail below, are connected to frame 28 of trailer 10 via loading beam 27 and, at the opposite end, have a head 23 with an undercut slot 24 to hook reel bar 8 from above. In order to urge reel bar 8 downward, and thereby complete securing of reel 2, upward hooking extension 15 is provided from head 23, over which chain 16 is draped and fastened to frame 28 via a standard assembly 17.

In keeping with the invention, trailer 10 is provided with ramp sections 31 properly spaced to accommodate circular ends 4, 6 of reel 2 so that reel 2 may be rolled up and settle into cradle 9. This avoids hoisting machinery and an unstable reel needing human guidance for loading the reel onto the transporter. Retractable outriggers 32 and 33 are provided to add stability to trailer 10 during loading of reel 10 or payout of wire or cable from reel 10 and are normally in the retracted position during transportation and the extended position during loading and payout.

Figure 7:
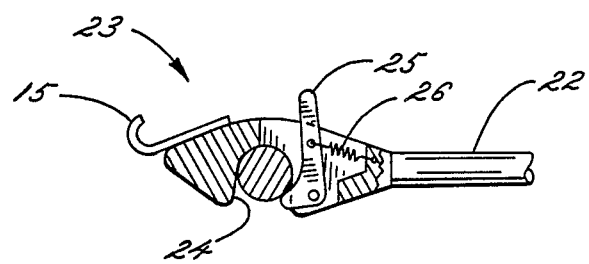
FIG. 7 is a view along line 7—7 in FIG. 1 of the maneuvering arms as they engage the reel bar.

In order to propel reel 2 along reel loading track 31, maneuvering arms 21, 22 along with heads 23 and undercut slots 24 hook onto reel bar 8 as shown in FIG. 7. Maneuvering arms 21, 22 are connected to loading beam 27 by linkage 29 which is connected to frame 28 through coupling 34. Linkage 29 is a standard linkage to maintain a substantially horizontal movement of heads 23 in order to avoid damage to the arms when not hooked to reel bar 8 through reel 2 by preventing heads 23 from hitting the ground or the frame of the trailer. Coupling 34 may be any suitable coupling and, in the preferred embodiment comprises a bore through the loading beam and two sections of the frame straddling the loading beam with matching bores to allow a rod therethrough securing the loading beam to the frame.

Figure 3:
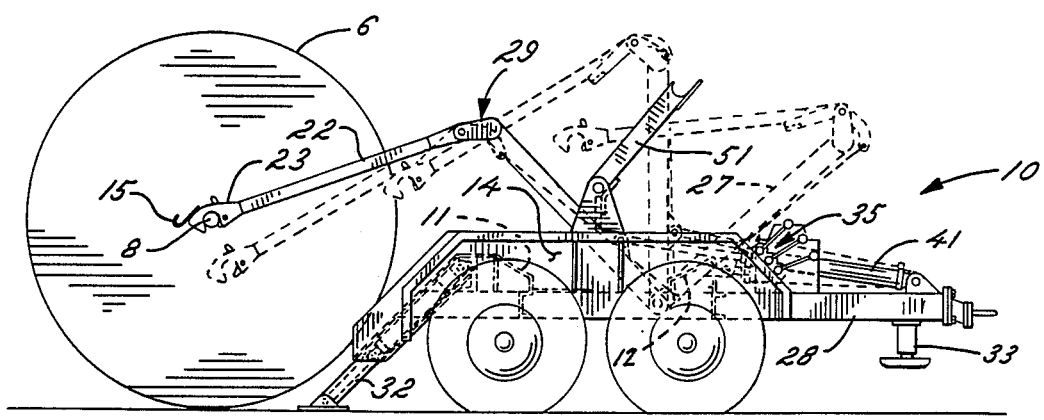
FIG. 3 is a device as in FIG. 1 showing the movement of the maneuvering arms to engage a reel.
Figure 4:
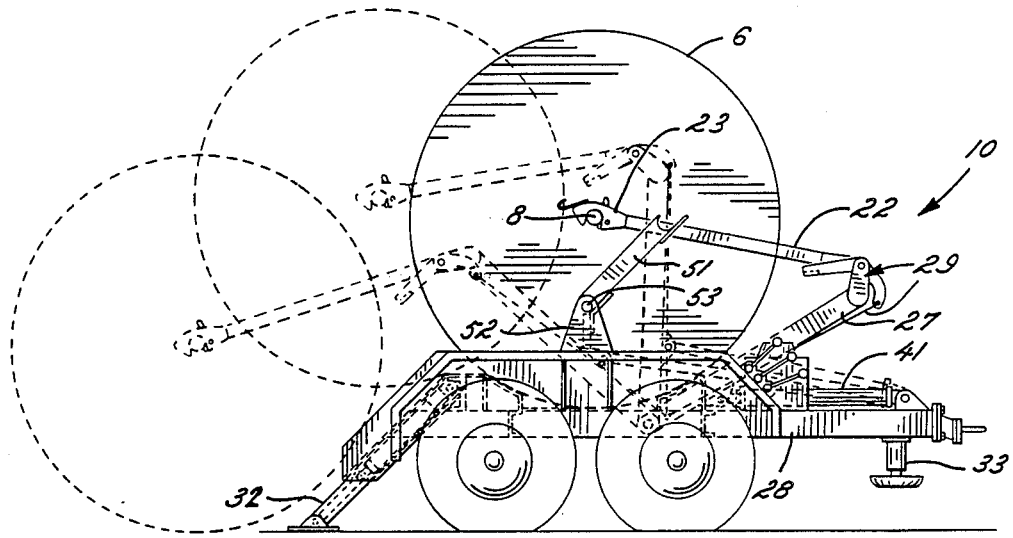
FIG. 4 is a device as in FIG. 1 showing the movement of the maneuvering arms to retrieve and position the reel into the cradle.

Turning now to FIGS. 3 and 4, the movement of arms 21, 22 (only 22 is shown in the side view) is shown for hooking and retrieving reel 2. In order to extend arms 21, 22 rearwardly, a double acting ram 41 is provided fastened to frame 28 and loading beam 27. As loading beam 27 is rotated rearwardly by means of ram 41, arms 21, 22 extend rearwardly keeping head 23 traversing a substantially horizontal path due to linkage 29. Linkage 29 further allows head 23 to be manually vertically displaced to aid in coupling of reel bar 8 as well as to accommodate different size reels.

In keeping with the invention, as shown in FIG. 7, head 23 is provided with undercut slot 24 deep enough to accommodate reel bar 8 and maintain reel bar 8 in slot 24 during loading. In order to maintain reel bar 8 in slot 24, locking member 25 is urged to hold and force reel bar 8 into slot 24 through spring 26.

Figure 5:
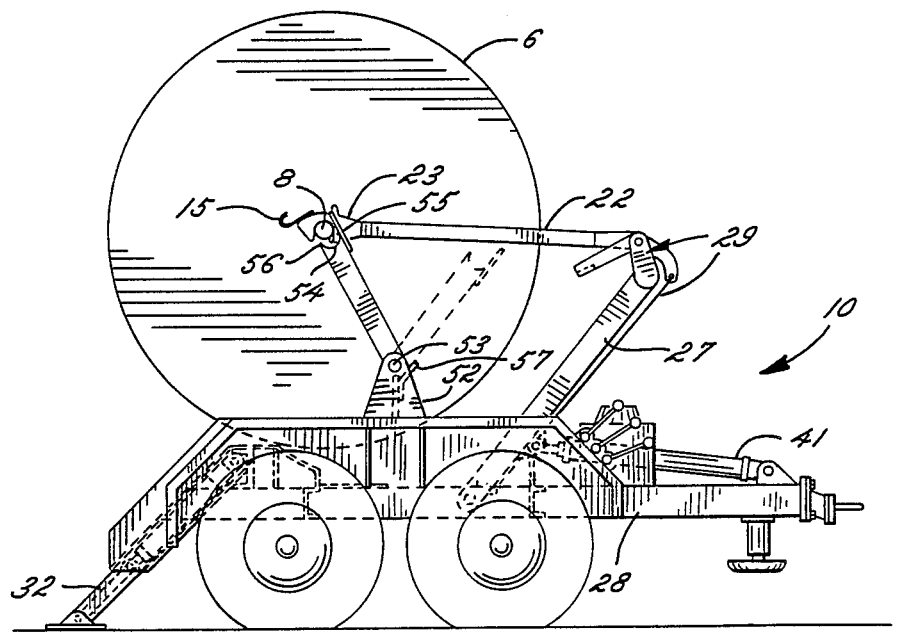
FIG. 5 is a device as in FIG. 1 with the reel rearward and the engagement of the support arms.
Figure 6:
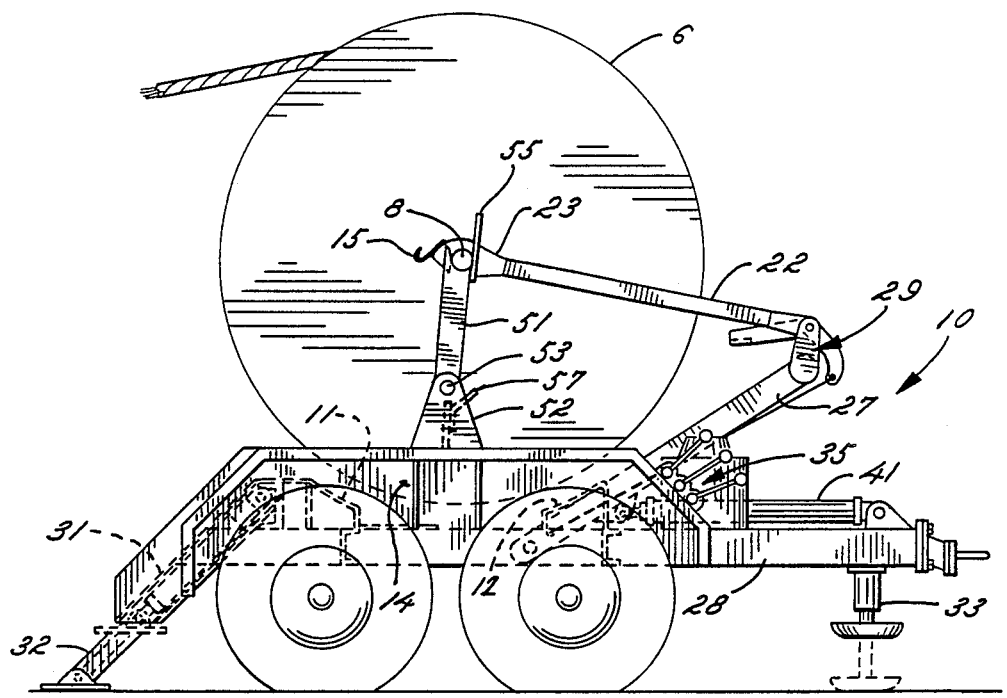
FIG. 6 is a device with the reel in the freewheeling position able to payout cable.

In keeping with the invention, a support set of arms 51 (FIGS. 1, 5-6) is pivotally mounted at one end to frame 28 via base 52 and is free to rotate about its pivot point 53 through a circular arc. The length of arm 51 is such that when arms 51 are vertical and reel bar 8 is resting in recess 54, reel 2 is vertically displaced from its cradle 9 and is free to rotate. Additionally, the arc that arms 51 traverse intersects the path of reel bar 8 as reel 2 is being loaded into trailer 10. In operation, ram 41 extends maneuvering arms 21, 22, pushing reel 2 and reel bar 8 rearwardly. At the point of intersection, reel bar 8 is stopped and support arms 51 are positioned so that reel bar 8 is in recess 54. Extension 55 is provided in order to assure that support arms 51 do not overrotate while being manipulated. Lip 56 is also provided in order to maintain reel bar 8 in recess 54 by providing lateral support to reel bar 8 during manipulation. After reel bar 8 and support arms 51 are positioned so that reel bar 8 rests in recess 54, maneuvering arms 21, 22 move reel bar 8 forward. Reel bar 8 must now follow the arc of support arms 51 and not the path to the reel cradle. When support arms 51 are vertical, they are proportioned for recess 54 to be above reel bar 8 when reel 2 is resting in cradle 9, and therefore reel 2 will rest only on arms 51, through reel bar 8, and not in cradle 9 or on supports 11, 12. Reel 2 is therefore free to rotate any payout cable.

In keeping with the invention brace 57 is provided to arms 51 to secure arms 51 in a position so that they do not interfere with the loading operation when the arms are not in use. Additionally, controls 35 are provided for operator control of outriggers 32, 33 and ram 41.

I claim:

1. A self-contained, self-loading reel trailer apparatus for manipulating a reel having circular ends and a central drum having a bore therethrough able to have cable wound thereon, or the like and having a reel bar through said bore, said apparatus comprising:

a transporting means having a cradle for receiving said circular ends to support said reel during transportation to resist forward, rearward and downward movement of said reel;

a loading means for loading said reel into said cradle comprising:

a reel loading ramp leading from the ground to the cradle;

a set of hydraulically activated maneuvering arms to propel said reel along said reel loading ramp until said reel settles in said cradle;

a set of support arms, each having a first end pivotally mounted to said apparatus, and each having recess means at a second end for engaging said reel bar; and an advancing means for advancing said reel bar to engage the recess means ends of the support arms and for pivoting said support arms so that said reel lifts from said cradle to a payout position where said reel may rotate about said reel bar to aid in winding or unwinding said cable from said reel.

2. An apparatus as claimed in claim 1 wherein said transporting means further comprises a set of lateral supports to resist lateral movement of said reel during transportation.

3. An apparatus as claimed in claim 1 wherein said transporting means further comprises a means for urging said reel bar towards said cradle to restrain upward movement of said reel during transportation.

4. An apparatus as claimed in claim 1 wherein said loading means includes a means for extending and retracting said hydraulically activated maneuvering arms so that said hydraulically activated maneuvering arms may couple said reel bar in an undercut slot located at a first end of said maneuvering arm.

5. An apparatus as claimed in claim 1 wherein said pivotably mounted support arms are each pivotably mounted on said apparatus so that the recess means end of said arms transverses an arc which (a) intersects a path which said reel bar must transverse during said loading and (b) is above said reel bar as said reel is in said cradle for vertically displacing said reel bar, and thereby said reel, so that said reel may rotate to facilitate said winding or unwinding of said cable from said drum of said reel.

6. An apparatus as claimed in claim 1 wherein the recess means of the support arms has a lip to maintain the reel bar in said recess means.

7. A method for loading, transporting and paying out cable wound on a reel having a reel bar through a central drum, said method comprising:

engaging said reel bar with a set of hydraulically activated maneuvering arms;

propelling said reel with said maneuvering arms along a reel loading ramp leading from the ground to a cradle until said reel rests in said cradle;

propelling said reel with said maneuvering arms until a set of support arms engage said reel bar;

propelling said reel with said maneuvering arms along an arc traversed by said support arms and pivoting said support arms with said maneuvering arms to disengage said reel from said cradle to leave said reel in a freewheeling position so that cable may be wound or unwound therefrom.

* * * * *